Patented May 22, 1928.

1,670,599

UNITED STATES PATENT OFFICE.

FRANCIS CLIFFORD DYCHE-TEAGUE, OF LONDON, ENGLAND.

RUBBER COMPOSITION.

No Drawing. Application filed February 19, 1926, Serial No. 89,496, and in Great Britain December 10, 1925.

Many attempts have been made to manufacture a carbonaceous material to be used as a substitute for gas black, namely, a carbon black derived from natural gas, as a reinforcing agent and filler for rubber.

In order to obtain a vulcanized rubber which is equally as ᴀ or better reinforced than rubber reinforced by gas black, and also to reduce the "dead" character noticeable in rubber mixes containing gas black, according to the invention a reinforcing agent and filler is used consisting of a carbon produced by gaseous reaction in the presence of a finely divided metal catalyst, the carbon being used preferably together with the catalyst on which it is deposited.

The mixture of carbon and catalyst need not contain more than 5 to 10% of catalyst.

A suitable method of producing economically a carbon deposit on a metal catalyst by gaseous reaction is for example by heating a carbonaceous material, such as coke, in one chamber to a temperature at or above say, 1000° C. in the presence of carbon dioxide, and passing the resulting carbon monoxide into another chamber cooled to a temperature of say 500° C. and containing a catalyst such as iron, nickel or cobalt or mixtures thereof. Carbon is deposited on the catalyst and carbon dioxide is again produced and is passed back into the coke chamber to again produce carbon monoxide.

This reaction is continued until the catalyst is masked by the carbon and the reaction is retarded. The mixture of carbon and catalyst then contains from 5 to 10% of catalyst and is ready for use as a substitute for gas black, although it is preferred to grind it and separate the coarser particles by screening or air floatation as is known in the art of treating ordinary gas black.

The catalyst in question preferably consists of approximately equal parts of finely divided nickel and iron powder formed by the reduction of NiO and $Fe_2O_3$ by carbon monoxide at about 500° C. Although the catalyst may only be present in the carbon to the extent of 5% or less it must not be regarded as a diluent or as an inert impurity from the point of view of rubber filling, as its presence appears to materially influence both the curing properties of the rubber mix and the physical properties of the mix when cured. Both iron and nickel are active in this direction as also is cobalt though in view of its greater cost the former are more useful.

The carbon produced as hereinabove set forth and containing a small amount of catalyst (up to 10%) has the following advantages over gas black produced from natural gas:—

(1) It possesses slightly greater toughening qualities.

(2) It reduces the dead effect.

(3) Its apparent gravity is greater than gas black (about twice as great) and it is therefore more easily stored.

(4) It can be introduced into the rubber very much more easily than gas black.

(5) It produces a mix which can be cured in a much shorter time than gas black.

As an example, a rubber mix is made up as follows:—

| | Parts by weight. |
|---|---|
| Rubber | 200 |
| Black (carbon and catalyst) | 72 |
| Zinc oxide | 20 |
| Sulphur | 8 |
| Diphenylguanidine | 2 |

This mix results in a cured rubber the mechanical properties of which were definitely better than those obtained with an otherwise similar mix containing gas black and cured to the same degree.

The reinforcing agent according to the invention also differs from gas black in that it is much easier to incorporate it with the rubber.

I claim:—

1. A reinforcing agent and filler for rubber consisting of a carbon produced by gaseous reaction in the presence of a finely divided metal catalyst together with the catalyst on which it is deposited.

2. A reinforcing agent and filler for rubber consisting of a carbon produced by reaction of carbon monoxide in the presence of a metal catalyst in a finely divided state together with the catalyst on which it is deposited.

3. A reinforcing agent and filler for rubber consisting of a carbon produced by reaction of carbon monoxide in the presence of a catalyst composed of a mixture of nickel and iron powder, together with said nickel and iron powder on which said carbon is deposited.

In testimony whereof I have signed my name to this specification.

FRANCIS CLIFFORD DYCHE-TEAGUE.